US012683831B2

(12) United States Patent
Jebramcik et al.

(10) Patent No.: US 12,683,831 B2
(45) Date of Patent: Jul. 14, 2026

(54) MODULAR MACHINE-AUTOMATION SYSTEM AND CLIENT MODULE

(71) Applicant: Beckhoff Automation GmbH, Verl (DE)

(72) Inventors: Patrick Jebramcik, Gütersloh (DE); Sebastian Sicken, Lichtenau-Holtheim (DE); Armin Pehlivan, Nüziders (AT); Thomas Morscher, Vienna (AT); Christoph Zech, Mödling (AT); Peter Fischer, Hartberg (AT); Peter Kastler, Vienna (AT); Milos Winter, Vienna (AT); Christoph Egger, Vienna (AT)

(73) Assignee: Beckhoff Automation GmbH, Verl (DE)

( * ) Notice: Subject to any disclaimer, the term of this patent is extended or adjusted under 35 U.S.C. 154(b) by 28 days.

(21) Appl. No.: 18/982,720

(22) Filed: Dec. 16, 2024

(65) Prior Publication Data

US 2025/0119315 A1    Apr. 10, 2025

Related U.S. Application Data

(63) Continuation of application No. PCT/EP2023/065680, filed on Jun. 12, 2023.

(30) Foreign Application Priority Data

Jun. 20, 2022    (DE) .................... 10 2022 115 314.2

(51) Int. Cl.
*H04L 12/42* (2006.01)
*B25J 9/16* (2006.01)

(52) U.S. Cl.
CPC ........... *H04L 12/42* (2013.01); *B25J 9/1617* (2013.01)

(58) Field of Classification Search
None
See application file for complete search history.

(56) References Cited

U.S. PATENT DOCUMENTS

| | | | |
|---|---|---|---|
| 5,069,524 A | 12/1991 | Watanabe et al. | |
| 5,712,552 A | 1/1998 | Hirai et al. | |
| | (Continued) | | |

FOREIGN PATENT DOCUMENTS

| | | |
|---|---|---|
| CN | 108789476 A | 11/2018 |
| CN | 110370261 A | 10/2019 |
| | (Continued) | |

OTHER PUBLICATIONS

English translation of DE202014010032U1 (Mar. 21, 2016), 11 pages.

(Continued)

*Primary Examiner* — Cai Y Chen
(74) *Attorney, Agent, or Firm* — Dorsey & Whitney LLP

(57) ABSTRACT

A modular machine-automation system includes a server module and a plurality of client modules. Each client module includes a housing having a first client module connection face with a first client signal transfer unit and a second client module connection face with a second client signal transfer, and a client bus switch-on unit. In an initialization mode, a client signal coupling unit in the client bus switch-on unit is configured to determine which client module connection face is connected to a server module connection face, either directly or via one or a plurality of further client modules, in order to switch to a first operating mode when the first client module connection face is coupled to the server module connection face, and to a second operating mode when the second client module connection face is coupled to the server module connection face.

15 Claims, 3 Drawing Sheets

(56) References Cited

U.S. PATENT DOCUMENTS

| | | | |
|---|---|---|---|
| 6,628,338 | B1 | 9/2003 | Elberbaum et al. |
| 8,692,500 | B2 | 4/2014 | Laceky et al. |
| 9,399,276 | B2 | 7/2016 | Sakata |
| 10,022,861 | B1 | 7/2018 | He et al. |
| 10,807,252 | B2 | 10/2020 | Nakayama et al. |
| 11,009,047 | B2 | 5/2021 | Markowski et al. |
| 12,005,577 | B2 | 6/2024 | Schober et al. |
| 2017/0057081 | A1 | 3/2017 | Krohne et al. |
| 2017/0341228 | A1 | 11/2017 | Ryu et al. |
| 2018/0099413 | A1 | 4/2018 | Naitou et al. |
| 2019/0163172 | A1 | 5/2019 | Daniel et al. |
| 2020/0009717 | A1 | 1/2020 | Lee |
| 2020/0405425 | A1 | 12/2020 | Shelton et al. |
| 2021/0178575 | A1 * | 6/2021 | Riek ..................... B25J 9/1661 |
| 2021/0387341 | A1 | 12/2021 | Liu et al. |
| 2022/0134539 | A1 | 5/2022 | Kastler et al. |
| 2023/0028405 | A1 | 1/2023 | Malzahn et al. |
| 2023/0082028 | A1 | 3/2023 | Kastler et al. |
| 2025/0114934 | A1 | 4/2025 | Beckmann et al. |

FOREIGN PATENT DOCUMENTS

| | | | |
|---|---|---|---|
| DE | 4132775 | A1 | 4/1993 |
| DE | 19958893 | A1 | 6/2001 |
| DE | 202014010032 | U1 | 3/2016 |
| DE | 102015216272 | A1 | 3/2017 |
| DE | 102017104319 | A1 | 9/2017 |
| DE | 102017123090 | A1 | 4/2018 |
| DE | 102018206009 | A1 | 10/2019 |
| DE | 102020115448 | A1 | 12/2021 |
| DE | 102020212464 | A1 | 4/2022 |
| DE | 102022115411 | B3 | 8/2023 |
| DE | 102022115314 | B4 | 3/2025 |
| EP | 0722811 | A1 | 7/1996 |
| EP | 2138281 | B1 | 3/2011 |
| EP | 3372354 | A1 | 9/2018 |
| EP | 3639983 | A1 | 4/2020 |
| WO | 2019038221 | A1 | 2/2019 |
| WO | 2021013913 | A1 | 1/2021 |
| WO | WO-2021123057 | A1 * | 6/2021 .......... B25J 19/0033 |
| WO | 2023247174 | A1 | 12/2023 |
| WO | 2023247244 | A1 | 12/2023 |

OTHER PUBLICATIONS

Examination Report dated Feb. 9, 2023 in connection with German patent application No. 10 2022 115 411.4, 10 pages including English translation.

Office Action dated Jun. 9, 2023 in connection with Chinese patent application No. 202180040823.5, 8 pages including English translation.

International Search Report and Written Opinion dated Jun. 12, 2023 in connection with International Patent Application No. PCT/EP2023/065680, 28 pages including English translation.

"A Modular Actuator Architecture for Robotic Applications," U.S. Department of Energy, Jul. 2001, 28 pages.

Examination Report dated Aug. 2, 2024 in connection with German patent application No. 10 2022 115 314.2, 14 pages including English translation.

International Preliminary Report on Patentability dated Sep. 12, 2022 in connection with PCT/EP2021/065422, 30 pages including English translation.

International Preliminary Report on Patentability dated Sep. 17, 2024 in connection with International patent application No. PCT/EP2023/065105, 36 pages including English translation.

International Search Report and Written Opinion dated Sep. 18, 2023 in connection with International Patent Application No. PCT/EP2023/065105, 30 pages including English translation.

International Search Report and Written Opinion dated Oct. 4, 2021 in connection with PCT/EP2021/065422, 17 pages including English translation.

International Preliminary Report on Patentability dated Oct. 9, 2024 in connection with International patent application No. PCT/EP2023/065680, 40 pages including English translation.

Office Action dated Nov. 16, 2020 in connection with German Patent Application No. DE 10 2020 115 448.8, 13 pages including English translation.

* cited by examiner

MODULAR MACHINE-AUTOMATION SYSTEM AND CLIENT MODULE

CROSS-REFERENCE TO RELATED APPLICATIONS

This patent application is a continuation of International Patent Application PCT/EP2023/065680, filed Jun. 12, 2023, entitled "Modular Machine Automation System and Client Module," which claims the priority of German patent application DE 10 2022 115 314.2, filed Jun. 20, 2022, entitled "Modulares Maschinen-Automatisierungssystem und Client-Modul," each of which is incorporated by reference herein, in the entirety and for all purposes.

FIELD

The invention relates to a modular machine-automation system, a modular robot and a client module for a modular machine-automation system.

BACKGROUND

The object of automation technology (implementation, measurement, control/regulation, communication, human/machine interface, safety, etc.) is to be able to operate machines independently and without human intervention. The degree of automation (ratio of automated production steps relative to all production steps) in a machine is higher the less dependent the machine is on human intervention. The object of automation technology is to relieve people of dangerous, strenuous or monotonous tasks, to improve the quality of the machine, to increase the performance of the machine or to reduce the costs of the machine.

Robots are an integral part of industrial automation. A robot is a programmable machine for handling, assembling or processing workpieces. The robot generally comprises a robot base, a robot arm (manipulator) having a number of proximal (towards a robot base) and distal (away from the robot base) arm limbs that may swivel and rotate in relation to one another, an (end-) effector (robot hand, tool, gripper, etc.) and a controller. When programmed, the robot is able to carry out a work process autonomously or to change the execution of a task depending on information from sensors that are usually located on the robot.

The so-called Local Area Network (LAN), which is a spatially limited network in which the various network subscribers are coupled with one another wirelessly, optically, electrically and/or optoelectrically, is usually used in automation technology for communication. The LAN is often embodied as a serial network, wherein all network subscribers are connected to each other via a bus.

Data are frequently exchanged on the bus in the form of datagrams, also referred to as telegrams. The telegrams are made up of control data and user data. The protocol generally used to control the data exchange on the bus is the Ethernet standard, which allows for telegrams with a length of up to 1500 bytes at a high transmission speed of up to 10 Gbit/sec.

For subscribers on the bus, a distinction is usually made between server units and client units. The server units are the control devices that have bus access authorization and determine the data transfer on the bus. The server units are therefore the source of the telegrams sent and circulated via the bus. The client units are machine devices or fieldbus devices that do not have bus access authorization, i.e. they may only acknowledge received telegrams or transmit telegrams to the server unit upon request. The Client units may read out data from the telegrams circulating on the bus and/or write data to the telegrams circulating on the bus. For data exchange between the client units and the circulating telegrams, the client units often use an area within the telegrams that is permanently assigned by the server units of the respective client units.

The bus of the machine-automation system often comprises a ring structure in which the individual client units are connected to one another on the transmission path to form a line, with each client unit being connected to two neighbors and the first and last client unit in the ring being connected to the server unit. The last client unit may be connected to the server unit either via a return path channel through the described line via all previous client units and/or via a direct connection of the last client unit to the server unit.

Machines, and robots in particular, are becoming increasingly modular. Standardized machine components allow for simplified assembly and extension. Standardized module interfaces may also significantly reduce the coupling effort.

In modular machines that comprise a plurality of drive axes that are controlled via a serial bus system, the drive axes are often distributed across different modules. The individual machine modules then contain an actuator, for example a servo drive, including an adjustment unit, for example a motor, and a bus switch-on unit.

In order to be able to chain the machine modules together via the bus, the machine modules are embodied in such a way that signals may be exchanged with a further module via at least two connection faces. Since the signal processing unit in the bus connection unit of the machine modules often comprises a fixed signal processing input interface or signal processing output interface, it is then necessary to connect the connection faces of the machine client modules starting from the machine server module in an assigned sequence in order to ensure the desired signal flow through the signal processing unit in the bus connection unit of the machine client modules.

It is often desirable to be able to assemble the machine-client modules in a freely selectable arrangement of the connection faces in order to achieve a certain embodiment of the machine or a certain machine functionality. In modular robots, for example, the module housings are often L-shaped with a short and a long cylindrical housing section, each of which comprises a connection face on the front. The range of the robot arm may then be determined by the arrangement of long and short module housing sections. However, the provision of a serial bus system with a bus connection unit in the robot arm modules, the signal processing unit of which comprises a fixed signal processing input interface or signal processing output interface, prevents such an individual assembly.

There is a need to provide a modular automation system, in particular a modular robot with a serial bus, in which a server module and a plurality of client modules may be freely arranged, even if the signal processing unit in the client modules prescribes a fixed signal processing input interface or signal processing output interface. Furthermore, it is the object of the invention to provide a corresponding client module for the modular machine-automation system.

SUMMARY

According to an aspect, a modular machine-automation system comprises a server module and a plurality of client modules. The server module comprises a server module housing having a server module connection face comprising a server signal transfer unit having a server signal transmitting unit and a server signal receiving unit, and a server signal processing unit. A signal output interface of the server signal processing unit is connected to the server signal transmitting unit and a signal input interface of the server signal processing unit is connected to the server signal receiving unit in order to transmit signals.

Each client module comprises a client module housing having a first client module connection face comprising a first client signal transfer unit having a first client signal transmitting unit and a first client signal receiving unit, a second client module connection face comprising a second client signal transfer unit having a second client signal transmitting unit and a second client signal receiving unit, and a client bus switch-on unit having a client signal coupling unit and a client signal processing unit. A signal processing input interface and a signal processing output interface of the client signal processing unit are connected to the client signal coupling unit, the client signal coupling unit being connected to the first client signal transmitting unit, the first client signal receiving unit, the second client signal transmitting unit and the second client signal receiving unit.

In a first mode of operation, the client signal coupling unit connects the first client signal receiving unit to a signal processing input interface of the client signal processing unit and the second client signal transmitting unit to a signal processing output interface of the client signal processing unit, and, in a second mode of operation, couples the second client signal receiving unit to the signal processing input interface of the client signal processing unit and the first client signal transmitting unit to the signal processing output interface of the client signal processing unit in order to transmit signals, wherein the first and second client module connection faces of each client module being respectively connectable to the server module connection face or the first and second client module connection faces of a further client module, in order to couple the client signal transfer unit of the client module connection face of the client module to the server signal transfer unit of the server module connection face or to the client signal transfer unit of the connected client module connection face of the further client module in order to transmit signals.

In an initialization mode, the client signal coupling unit in the client bus switch-on unit of the client module is embodied to determine which client module connection face is connected to the server module connection face directly or via one or a plurality of further client modules, in order to switch to the first operating mode when the first client module connection face is coupled directly or via one or a plurality of further client modules to the server module connection face, and to switch to the second operating mode when the second client module connection face is coupled directly or via one or a plurality of further client modules to the server module connection face so that a ring-shaped transmission path having two channels is embodied in which telegrams are processed on one channel with the aid of the client signal processing unit in the client module.

According to another aspect, a modular robot having a robot arm comprises a server module and a plurality of arm modules, each arm module including an arm module housing having a first arm module connection face comprising a first arm module signal transfer unit having a first arm module signal transmitting unit and a first arm module signal receiving unit, a second arm module connection face comprising a second arm module signal transfer unit having a second arm module signal transmitting unit and a second arm module signal receiving unit, an arm module bus switch-on unit and an arm module signal processing unit.

In an initialization mode, an arm module signal coupling unit in the arm module bus switch-on unit of the arm module is embodied to determine which arm module connection face is connected to a server module connection face directly or via one or a plurality of further arm modules in order to switch to a first operating mode, when the first arm module connection face is coupled directly or via one or a plurality of further arm modules to the server module connection face, and in order to switch to a second operating mode when the second arm module connection face is coupled directly or via one or a plurality of further arm modules to the server module connection face, so that a ring-shaped transmission path having two channels is embodied in which telegrams are processed on one channel with the aid of the arm module signal processing unit in the arm module.

According to another aspect, a modular machine-automation system comprises a server module and a plurality of client modules, each client module including a client module housing having a first client module connection face comprising a first client signal transfer unit having a first client signal transmitting unit and a first client signal receiving unit, a second client module connection face comprising a second client signal transfer unit having a second client signal transmitting unit and a second client signal receiving unit, and a client bus switch-on unit and a client signal processing unit.

In an initialization mode, a client signal coupling unit in the client bus switch-on unit of the client module is embodied to determine which client module connection face is connected to a server module connection face directly or via one or a plurality of further client modules in order to switch to a first operating mode, when the first client module connection face is coupled directly or via one or a plurality of further client modules to the server module connection face, and in order to switch to a second operating mode when the second client module connection face is coupled directly or via one or a plurality of further client modules to the server module connection face, so that a ring-shaped transmission path having two channels is embodied in which telegrams are processed on one channel with the aid of the client signal processing unit in the client module.

EXAMPLES

A modular machine-automation system comprises a server module and a plurality of client modules. The server module includes a server module housing having a server module connection face comprising a server signal transfer unit having a server signal transmitting unit and a server signal receiving unit, as well as a server signal processing unit. A signal output interface of the server signal processing unit is connected to the server signal transmitting unit and a signal input interface of the server signal processing unit is connected to the server signal receiving unit in order to transmit signals.

Each client module comprises a client module housing having a first client module connection face comprising a first client signal transfer unit comprising a first client signal transmitting unit and a first client signal receiving unit, a second client module connection face comprising a second client signal transfer unit having a second client signal transmitting unit and a second client signal receiving unit, and a client bus switch-on unit having a client signal coupling unit and a client signal processing unit. A signal processing input interface and a signal processing output interface of the client signal processing unit are connected to the client signal coupling unit. The client signal coupling unit is connected to the first client signal transmitting unit, the first client signal receiving unit, the second client signal transmitting unit and the second client signal receiving unit.

In a first mode of operation, the client signal coupling unit couples the first client signal receiving unit to a signal processing input interface of the client signal processing unit and the second client signal transmitting unit to a signal processing output interface of the client signal processing unit, and couples the second client signal receiving unit to the signal processing input interface of the client signal processing unit and the first client signal transmitting unit to the signal processing output interface of the client signal processing unit in a second mode of operation to transmit signals. The first and second client module connection faces of each client module are respectively connectable to the server module connection face or the first and second client module connection faces of a further client module to couple the client signal transfer unit of the client module connection face of the client module to the server signal transfer unit of the server module connection face or to the client signal transfer unit of the connected client module connection face of the further client module in order to transmit signals.

In an initialization mode, the client signal coupling unit in the client bus switch-on unit of the client module is embodied to determine which client module connection face is connected to the server module connection face directly or via one or a plurality of further client modules in order to switch to the first operating mode, when the first client module connection face is coupled directly or via one or a plurality of further client modules to the server module connection face, and to switch to the second operating mode when the second client module connection face is coupled directly or via one or a plurality of further client modules to the server module connection face.

With the aid of the client signal coupling unit in the client module, a freely selectable arrangement of the connection faces of the client modules is possible when assembling the modular machine-automation system. The client signal coupling unit in the bus switch-on unit of the client module thus ensures that, regardless of how the connection faces of the client modules are arranged in the chain when assembling the modular machine, a two-channel ring-shaped transmission path is formed, in which the signal cycle through the signal processing unit in the bus switch-on unit of the client modules is ensured on one of the two channels in the desired sequence.

In the modular machine-automation system, the server signal transfer unit may comprise a server control signal transfer unit, the first client signal transfer unit may comprise a first client control signal transfer unit and the second client signal transfer unit comprise have a second client control signal transfer unit. The server control signal transfer unit is connected to the server signal processing unit and the first and second client control signal transfer units are connected to the client signal coupling unit.

In the initialization mode, the server signal processing unit is embodied to output a control signal, and the client signal coupling unit is embodied to receive and forward the control signal, wherein the client signal coupling unit is further embodied to determine from which of the client signal coupling units the control signal has been received, to determine the client module connection face connected to the server module connection face directly or via one or a plurality of further client modules as the client module connection face comprising the client signal coupling unit with the client signal coupling unit on which the control signal was received.

With the aid the additional control signal transmission in an initialization mode, the client signal coupling unit in the client bus switch-on unit of the client module may easily determine which client module connection face is connected to the server module connection face directly or via one or a plurality of further client modules.

The control signal may in this context be a high-low level signal, which allows for a simple embodiment of the control signal transmission.

The client-signal coupling device may have a first changeover switch and a second changeover switch, each comprising at least one 2-1 multiplexer. This embodiment allows for easy switching between the first and second operating modes.

The client signal processing unit may comprise a signal amplification path having a signal processing input interface and a signal amplification input interface. The first changeover switch then comprises a first input switch and a first output switch, and the second changeover switch then comprises a second input switch and a second output switch.

A first input of the first input switch is connected to the first client signal receiving unit, a second input of the first input switch is connected to the second client signal receiving unit, and an output of the first input switch is connected to the signal processing input interface of the client signal processing unit. A first input of the second input switch is connected to the second client signal receiving unit, a second input of the second input switch is connected to the first client signal receiving unit, and an output of the second input switch is connected to a signal amplification input interface of the client signal processing unit.

An input of the first output switch is connected to a signal amplification output interface of the client signal processing unit, a first output of the first output switch is connected to the first client signal transmitting unit, and a second output of the first output switch is connected to the second client signal transmitting unit. An input of the second output switch is connected to the signal processing output interface of the client signal processing unit, a first output of the second output switch is connected to the second client signal transmitting unit and a second output of the second output switch is connected to the first client signal transmitting unit.

With the signal amplification path in the client signal processing unit, a signal refresh of the processed telegram may be carried out on the return path channel, wherein the embodiment of the client signal coupling unit ensures that regardless of how the connection faces of the client modules are arranged in the chain when assembling the modular machine, the signal amplification path is ensured by the signal processing unit in the bus connection unit of the client modules on the return path channel.

The modular machine-automation system may be embodied as a modular robot, wherein a robot arm is composed of a plurality of arm modules, with one or a plurality of arm modules each forming a client module.

The plurality of arm modules may be divided into active arm modules and passive arm modules, wherein the active arm modules each have a drive device with the aid of which a further arm module that may be connected to them may be swivelled, turned and/or rotated. This embodiment allows for a robot arm that is particularly easy and flexible to assemble.

In the active arm module, the first connection face may be embodied to be controllably rotatable relative to the second connection face about an axis of rotation, wherein the first connection face is arranged on the arm module so that it may rotate about the axis of rotation and the second connection face is arranged on the arm module so that it cannot rotate. A rotational transmission device for signals, energy and/or fluid may be provided in the active arm module in order to connect the first connection face optically, electrically and/or fluidically to the second connection face.

The above-mentioned conceivable embodiment of the active arm module ensures essentially unrestricted rotatability of the first connection face.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
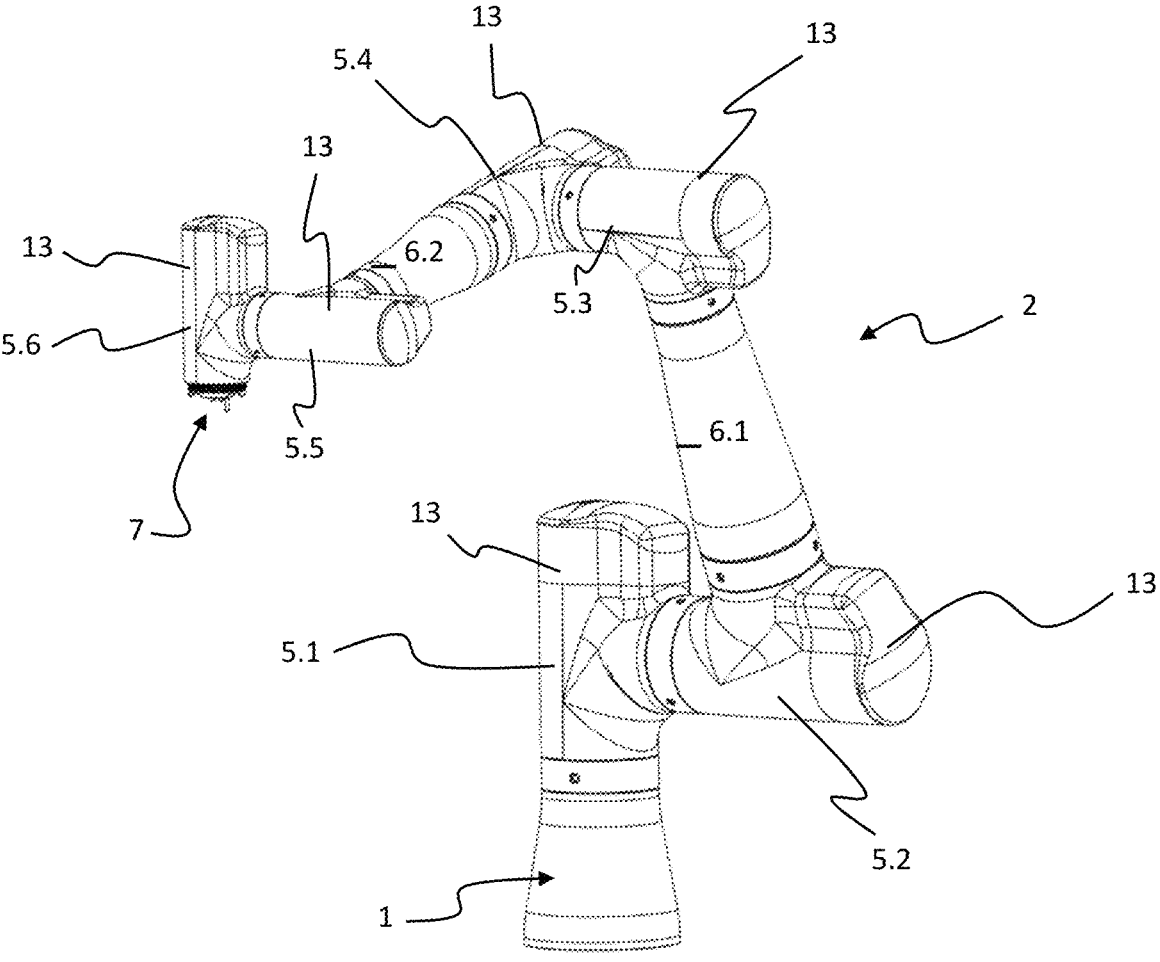
FIG. 1 shows a three-dimensional side view of a modular robot.

In the drawings only those spatial sections of an object of the invention are shown which are necessary in order to understand the invention.

DETAILED DESCRIPTION

The invention is described in more detail below with reference to a modular robot. Although the invention is described and illustrated in more detail by the embodiment, the invention is not limited by the disclosed embodiment, but is of a more fundamental nature. In principle, the invention may be used in modular machines controlled by automation systems in which a bus connection unit is arranged in individual machine modules, the signal processing unit of which comprises a fixed signal processing input interface or signal processing output interface, wherein the connection faces of the machine modules, via which signals are transmitted between machine modules, may be freely combined.

FIG. 1 shows a modular robot comprising a robot base 1, a robot arm 2 and an interchangeable (end-) effector with a tool, a gripper etc., which is arranged at a distal end 7 of the robot arm 2.

The robot arm 2 has a modular embodiment with a plurality of arm modules—eight arm modules in the embodiment shown in FIG. 1—wherein a distinction is made between active arm modules 5 and passive arm modules 6. An active arm module 5 comprises a drive device 13 with the aid of which a further arm module that may be connected to it may be pivoted, turned and/or rotated. A passive arm module 6, on the other hand, does not comprise any drive device.

The arm modules are embodied in such a way that signals, energy and/or fluids may be exchanged with the further arm module via the first connection face or the second connection face. The first connection face is mechanically, optically, electrically and/or fluidically connected to the second connection face.

The active arm modules 5 of the robot arm 2 in FIG. 1 have an L-shaped housing, whereas the housing of the passive arm modules 6 of the robot arm 2 has an I-shape. The active arm modules 5 each comprise a first connection face on the end face and a second connection face on the longitudinal body side. The two connection faces of the passive arm module 6 are each embodied on the front side. Instead of an L-shape for the active arm module 5 or an I-shape for the passive arm module 6, other geometric housing shapes may also be used.

With the exception of the robot base 1 and of the effector at the distal end 7, the arm modules are embodied in such a way that two connections of two arm modules may always be connected to each other. This means that a first connection face of any arm module may be connected to a second connection face of any other arm module, or vice versa.

The first connection face and the second connection face of the arm module each have a uniform contacting mimic. However, it is also possible to form the first connection face and the second connection face of the arm module with a complementary contacting mimic. In order to achieve a high degree of flexibility when assembling the arm modules, the two connection faces of the active arm modules, for example, are embodied to be complementary (male and female), whereas the two connection faces of the passive arm modules are embodied to be analogous (male or female).

In the active arm module 5, the first connection face is embodied to be controllably rotatable relative to the second connection face about an axis of rotation. The first connection face may be arranged on the arm module so that it may rotate about the axis of rotation, while the second connection face is arranged on the arm module so that it cannot rotate. However, the first and second connection faces may also swap places.

The first connection face of the active arm module 5 is rotated by the drive unit 13. The drive device 13 may be embodied as an electric motor with an outer stator and an inner rotor mounted to rotate about the axis of rotation, wherein the rotor is connected to the first connection face in a torque-locking manner. The stator is then non-rotatably connected to the housing.

Furthermore, a gear unit may be provided in the active arm module 5 in order to convert the input speed of the electric motor on the input side of the gear unit into an output speed on the output side of the gear unit. The drive unit 13 may then have a hollow shaft and an output shaft. The hollow shaft and the output shaft are each rotatably mounted about the axis of rotation, with the output shaft being rotatably accommodated in the hollow shaft. The hollow shaft is then non-rotatably connected to the input side of the gear unit. Furthermore, the output side of the gear unit is non-rotatably connected to the output shaft. The first connection face of the active arm module 5 may then be non-rotatably connected to the output shaft of the drive unit 13.

The active arm module 5 may have a rotation transmission device for signals, energy and/or fluid in the housing in order to connect the first connection face optically, electrically and/or fluidically to the second connection face. The rotation transmission device may be a slip ring device arranged between the output shaft of the drive device and the housing.

The robot arm 2 in the embodiment shown in FIG. 1 has six rotational degrees of freedom. Any number of complete and partial rotations of a respective arm module of the robot arm 2 may be carried out in both circumferential directions of a respective axis of rotation. It is also possible to embody a respective rotation axis as a swivel axis or rotation axis, i.e. to restrict a movement of the respective arm module to a certain angle.

Sensors may be assigned to an arm module or a respective axis of rotation of the arm module, the data of which may be used to control the corresponding arm module or the robot arm 2. For example, a force and/or torque sensor as well as a position sensor may be provided, with which a force and/or torque on the arm module as well as a position of the arm module may be detected. This may also be limited to a section or a longitudinal end section of the robot arm 2.

In FIG. 1, the active arm modules 5 and the passive arm modules 6 are each provided with an additional number separated by a dot to distinguish them, wherein the arm modules of the robot arm 2 are numbered starting from the robot base 1 in the direction of the distal end 7.

In the embodiment shown in FIG. 1, a first active arm module 5.1 is connected to the robot base 1 on the first connection face. The first connection face of a second active arm module 5.2 is connected to the second connection face of the first active arm module 5.1. A first passive arm module 6.1 is arranged between the second active arm module 5.2 and a third active arm module 5.3, which connects the second connection face of the second active arm module 5.2 to the second connection face of the third active arm module 5.3.

The second connection face of a fourth active arm module 5.4 is connected to the first connection face of the third active arm module 5.3. The first connection face of the fourth active arm module 5.4 is connected to the second connection face of a fifth active arm module 5.5 via a second passive arm module 6.2. The second connection face of a sixth active arm module 5.6 is connected to the first connection face of the fifth active arm module 5.5, the first connection face of which then forms the distal end 7 of the robot arm 2.

For communication in modular machines, such as the modular robot shown in FIG. 1, so-called Local Area Networks (LAN) are used, in which the various modules are coupled with one another using signal technology. The LAN is embodied as a serial network in which all modules are connected to each other via a bus.

Data is exchanged on the bus in the form of datagrams, also known as telegrams. The telegrams are made up of control data and user data. The protocol generally used to control data exchange on the bus is the Ethernet standard, which allows for telegrams having a length of up to 1500 bytes and a high transmission speed of up to 10 Gbit/sec. However, it is also possible to use non-Ethernet-based protocols such as the CANOpen protocol.

Access to the bus is organized hierarchically. The machine control devices are the server modules that determine the telegram traffic on the bus. The machine function devices are the client modules, which have no bus access authorization. The client modules may exchange data with the telegrams on the bus or acknowledge received telegrams or transmit telegrams to the server unit on request.

The individual client modules of the modular machine are connected to form a bus chain, with each of the client modules being connected to two neighbors, the first client module and the last client module in the chain being connected to the server module. Data is transmitted in one direction from the server module to the first client module and from there to the last client module and then back to the server module.

The ring-shaped transmission path is embodied with two channels. The transmission takes place in such a way that the telegram output by the server module is passed from the first client module to the last client module on a first outgoing channel, wherein each client module carries out the desired data exchange with the telegram when the telegram passes through the bus switch-on unit provided in the client module. The last client module then couples the processed telegram back to a second return path channel, wherein each client module then only passes the telegram through and the first client module finally transmits the telegram to the server module. However, it is also possible for the telegram processing to be carried out on the second return channel instead of the first outgoing channel. In the following, however, it is assumed that a first outgoing channel telegram processing takes place.

In the case of a two-channel ring-shaped transmission path, if the signal processing unit in the bus switch-on unit of the client modules comprises a fixed signal processing input interface or signal processing output interface, it is necessary to interconnect the connection faces of the client module, starting from the server module, in such a way that the telegram throughput in the flow direction specified by the signal processing input interface or the signal processing output interface of the signal processing unit in the bus switching unit, i.e. on the first outgoing channel, is safeguarded.

In order to enable a freely selectable arrangement of the connection faces of the client module when assembling the modular machine, each client module comprises a client signal coupling unit. The signal processing input interface and the signal processing output interface of the client signal processing unit of the bus switch-on unit are then connected to the client signal coupling unit.

The client signal coupling unit is then embodied in such a way that an operating mode of the client signal coupling unit is switched depending on which client module connection face is connected to the server module connection face directly or via one or a plurality of further client modules, in which the client signal receiving unit of the client signal transfer unit of this client module connection face is connected to a signal processing input interface of the client signal processing unit, whereas the client signal transmitting unit of the client signal transfer unit of the further client module connection face is connected to the signal processing output interface of the client signal processing unit.

The client signal coupling unit in the bus switch-on unit of the client module thus ensures that, regardless of how the connection faces of the client modules are arranged in the chain when the modular machine is assembled, a two-channel ring-shaped transmission path is formed, in which the telegram flow through the signal processing unit in the bus switch-on unit of the client modules is ensured on the first outgoing channel.

In order to allow for the client signal coupling unit in the client bus switch-on unit of the client module to determine which client module connection face is connected to the server module connection face directly or via one or a plurality of additional client modules, an additional control signal transmission may be provided in an initialization mode.

The server module is then embodied to output a control signal in initialization mode either directly on the ring-shaped transmission path or also via an additional control signal transmission path. The client signal coupling unit of the client modules is then embodied to receive and forward the control signal, wherein the client signal coupling unit is further embodied to determine on which of the client module connection faces the control signal was received. The client module connection face thus determined is then the client module connection face which switches the client signal coupling unit in the operating mode selection such that the client signal receiving unit of the client signal transfer unit of the client module connection face is connected to a signal processing input interface of the client signal processing unit.

Figure 2:
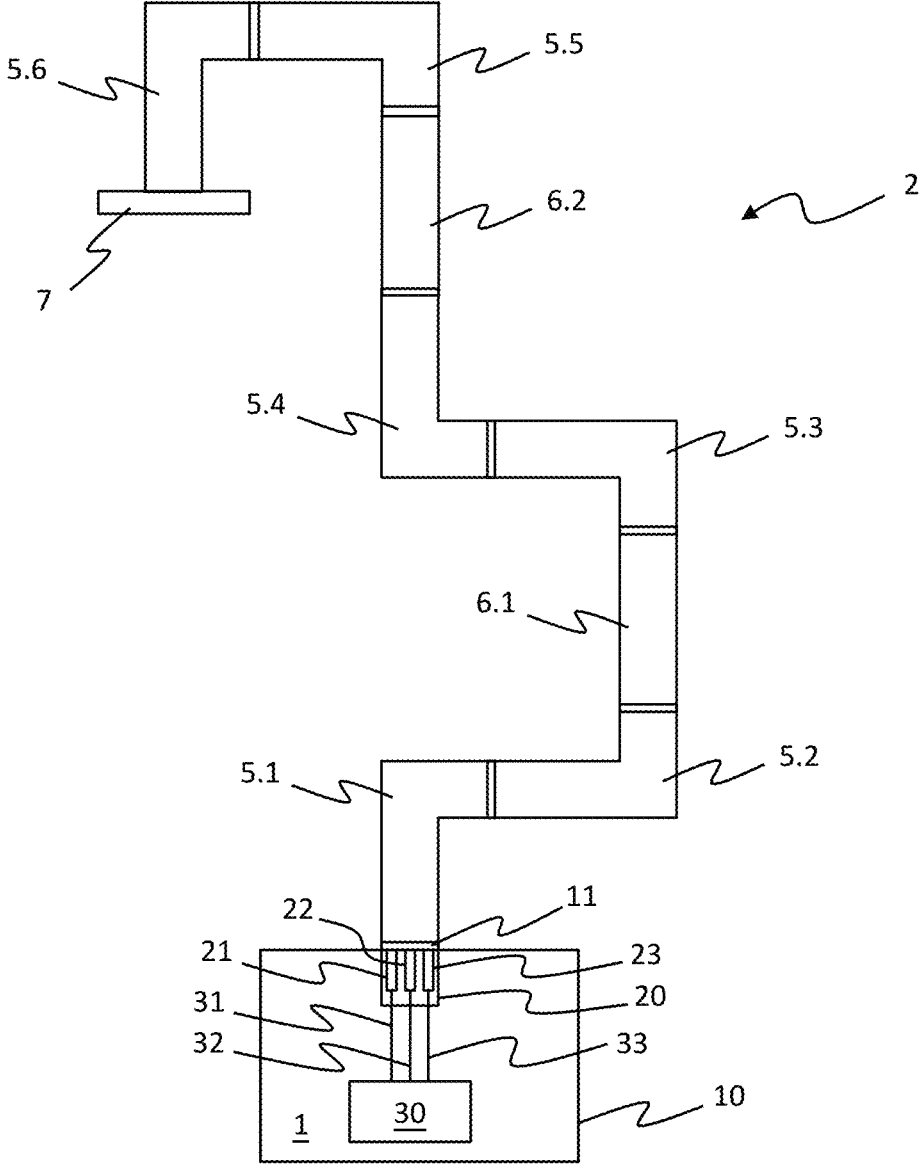
FIG. 2 shows a schematic depiction of the modular robot from FIG. 1.

A possible structure of the server module or the client modules of a modular machine is shown for the embodiment of the modular robot in FIG. 1 in a schematic depiction in FIG. 2. In FIG. 2, the basic module arrangement of robot base 1, active arm modules 5 and passive arm modules 6 as well as distal end 7 is taken from the robot illustration in FIG. 1.

The robot base 1 forms the server module. However, the server module may also be arranged separately from the robot base of the modular robot, for example in a control cabinet. Furthermore, the server module may be located anywhere in the modular arrangement of the robot arm.

The server module comprises a server module connection face 11 at a server module housing 10, which comprises a server signal transfer unit 20 having a server signal transmitting unit 21 and a server signal receiving unit 22. Furthermore, a server signal processing unit 30 is provided, wherein a signal output interface 31 of the server signal processing unit 30 is connected to the server signal transmitting unit 21 and a signal input interface 32 of the server signal processing unit 30 is connected to the server signal receiving unit 22 in order to transmit telegrams.

The server module further comprises, in the server signal transfer unit 20, a server control signal transfer unit 23, which is connected to a control signal interface 33 of the server signal processing unit 30.

The arm modules of the robot arm 2 represent the client modules. Each arm module may be a client module. However, only the active arm modules 5 may also form the client modules. In the active arm module 5, the bus switch-on unit is then connected, for example, to an electronic controller for controlling the drive unit 13. The passive arm modules 6 may be embodied without their own bus switch-on unit and then only loop through the telegrams on the two-channel ring-shaped transmission path. However, the passive arm modules 6 may also comprise their own bus switch-on unit, for example to transmit geometric data or status information from the passive arm modules 6 or data from a sensor system, an operator interface or other devices connected to the passive arm modules to the server module.

Figure 3:
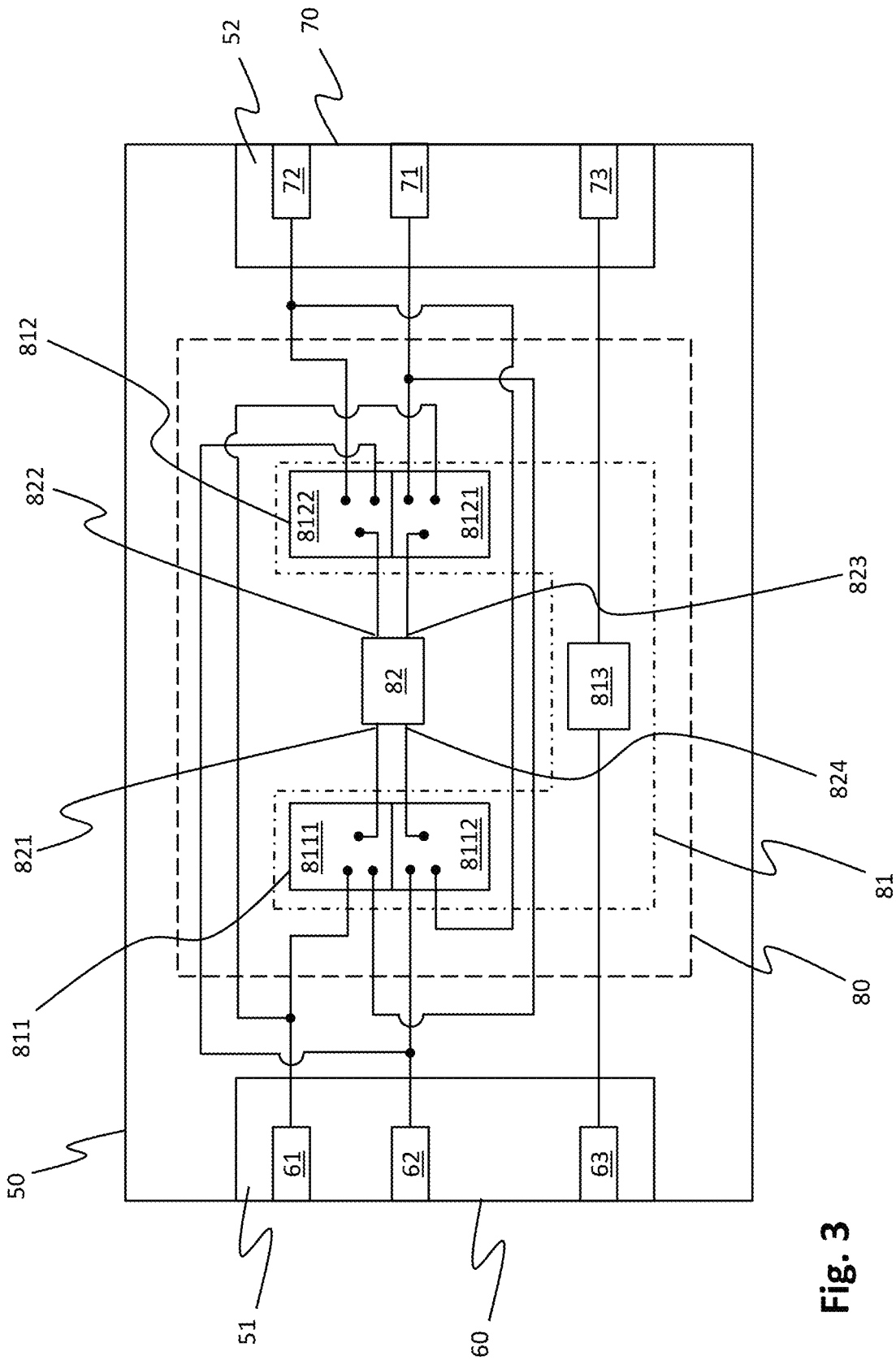
FIG. 3 shows is a schematic depiction of a client module.

FIG. 3 shows a schematic diagram of a client module. Each client module comprising a client module housing having with a first client module connection face 51, which comprises a first client signal transfer unit 60, and a second client module connection face 52, which comprises a second client signal transfer unit 70.

The first client module connection face 51 and the second client module connection face 52 may be connected to the server module connection face or the first and second client module connection face of a further client module in order to couple the client signal transfer unit of the client module connection face of the client module to the server signal transfer unit of the server module connection face or the client signal transfer unit of the connected client module connection face of the further client module in order to transmit telegrams.

Furthermore, a client bus switch-on unit 80 is arranged in the client module housing 50, which comprises a client signal coupling unit 81 and a client signal processing unit 82. The client signal processing unit 82 thereby comprises a signal processing path with a signal processing input interface 821 and a signal processing output interface 822, on which the telegram is processed on the fly.

In addition, as shown in FIG. 3, a signal amplification path with a signal amplification output interface 824 and a signal amplification input interface 823 may be provided in the client signal processing unit 82 in order to carry out signal refreshing. However, no data exchange with the telegram is performed on the signal amplification path in the client signal processing unit 82. However, a signal amplification path in the client signal processing unit 82 may also be dispensed with. The telegram is then routed past the client signal processing unit on its way back to the server module through the client modules.

A first client signal receiving unit 61 and a first client signal transmitting unit 62 are provided in the first client signal transfer unit 60. The second client signal transfer unit 70 comprises a second client signal receiving unit 71 and the second client signal transmitting unit 72.

The first client signal transfer unit 60 comprises a first client control signal transfer unit 63 and the second client signal transfer unit 70 comprises a second client control signal transfer unit 73. The first client control signal transfer unit 63 and the second client control signal transfer unit 73 may be connected to the server control signal transfer unit of the server module connection face or the first and second client module connection faces of a further client module, in order to couple the client control signal transmitting unit of the client module connection face of the client module with the server control signal transmitting unit of the server module connection face or the client signal transmitting unit of the connected client module connection face of the further client module in order to transmit control signals.

The client signal coupling unit 81 has a first changeover switch 811 and a second changeover switch 812. The first changeover switch 811 comprises a first input switch 8111 and a first output switch 8112. The second changeover switch 812 comprises a second input switch 8121 and a second output switch 8122. The first input switch 8111, the first output switch 8112, the second input switch 8121 and the second output switch 8122 are each embodied as 2-1 multiplexers. Furthermore, a control signal evaluation unit 813 is provided in the client signal coupling unit 81.

Then, if only one signal processing path and no signal amplification path is provided in the client signal processing unit 82, the first changeover switch and the second changeover switch may each comprise only a single switch. The telegram is then only routed through the client signal processing unit 82 on the outward path coming from the server module. On the return path to the server module, however, the telegram bypasses the client signal processing unit 82 in the client module.

The first and second client signal receiving and transmitting units 61, 62, 71, 72 of the first and second first client signal transfer units 60, 70, the switching units 811, 812 of the client signal coupling unit 81 and the client signal processing unit 82 are interconnected via a line network.

The first client signal receiving unit 61 is connected to a first input of the first input switch 8111 of the first changeover switch 811. A second input of the first input switch 8111 of the first changeover switch 811 is connected to the second client signal receiving unit 71. An output of the first input switch 8111 of the first changeover switch 811 is further connected to the signal processing input interface 821 of the client signal processing unit 82.

The second input switch 8121 of the second changeover switch 812 has a first input connected to the second client signal receiving unit 71 and a second input connected to the first client signal receiving unit 61. An output of the second input switch 8121 of the second changeover switch 812 is connected to the signal amplification input interface 823 of the client signal processing unit 82.

An input of the first output switch 8112 is connected to the signal amplification output interface 824 of the client signal processing unit 82. The first client signal transmitting unit 62 is further connected to a first output of the first output switch 8112 of the first changeover switch 811. A second output of the first output switch 8112 of the first changeover switch 811 is connected to the second client signal transmitting unit 72.

An input of the second output switch 8122 of the second changeover switch 812 is connected to the signal processing output interface 822 of the client signal processing unit 82. The second output switch 8122 of the second changeover switch 812 has a first output connected to the second client signal transmitting unit 72 and a second output connected to the first client signal transmitting unit 62.

In the robot structure shown in FIGS. 1 and 2, the first connection face of the active arm module 5 is located on the long housing section of the L-shape and the second connection face is located on the short housing section of the L-shape. In the passive arm module 6 with the I-shape, the first and second connection faces are located at the ends of the housing.

As the schematic diagram in FIG. 2 shows, the server module connection face 11 of the robot base 1 is connected to the first connection face of the first active arm module 5.1. The second connection face of the first active arm module 5.1 is connected to the first connection face of the second active arm module 5.2. The second connection face of the second active arm module 5.2 makes contact with the first connection face of the first passive arm module 6.1.

The second connection face of the passive arm module 6.1 is connected to the second connection face of the third active arm module 5.3. The first connection face of the third active arm module 5.3 makes contact with the second connection face of the fourth active arm module 5.4. The first connection face of the fourth active arm module 5.4 is connected to the first connection face of the second passive arm module 6.2.

The second connection face of the passive arm module 6.2 is connected to the second connection face of the fifth active arm module 5.5. The first connection face of the fifth active arm module 5.1 couples with the second connection face of the sixth active arm module 5.6. The first connection face of the sixth active arm module 5.6 forms the distal end 7 of the robot arm.

If it is assumed that only the active arm modules 5 are embodied as client modules with a bus connection unit, the first connection faces 51 of the first active arm module 5.1 and the second active arm module 5.2 are connected to the server module connection face 11 of the robot base 1 directly or via intermediate arm modules. In the case of the third active arm module 5.3, the fourth active arm module 5.4, the fifth active arm module 5.5 and the sixth active arm module 5.6, the second connection face 52 is coupled to the server module connection face 11 of the robot base 1 via the intermediate arm modules.

The client signal coupling unit 81 of the client bus switch-on unit 80 has two operating modes, which are set by the first and second changeover switches 811, 812, each of which has two 2-1 multiplexers.

In the first operating mode, the client signal coupling unit 81 couples the first client signal receiving unit 61 to the signal processing input interface 821 of the client signal processing unit 82 and the second client signal transmitting unit 72 to the signal processing output interface 822 of the client signal processing unit 82 via the first and second changeover switches 811, 812.

In this context, the first input of the first input switch 8111 of the first changeover switch 811 is connected to the output of the first input switch 811 of the first changeover switch 811 in order to connect the first client signal receiving unit 61 to the signal processing input interface 821 of the client signal processing unit 82.

Furthermore, the input of the second output switch 8122 of the second changeover switch 812 is connected to the first output of the second output switch 8122 of the second changeover switch 812 in order to apply the signal processing output interface 822 of the client signal processing unit 82 to the second client signal transmitting unit 72.

Furthermore, in the second input switch 8121 of the second changeover switch 812, the first input is connected to the output to switch the second client signal receiving unit 71 through to the signal amplification input interface 823 of the client signal processing unit 82.

The input of the first output switch 8112 is coupled to the first output of the first output switch 8112 to switch through the signal amplification output interface 824 of the client signal processing unit 82 to the first client signal transmitting unit 62.

In the second mode of operation of the client signal coupling unit 81, the second client signal receiving unit 71 is connected to the signal processing input port 821 of the client signal processing unit 82 and the first client signal transmitting unit 62 is connected to the signal processing output port 822 of the client signal processing unit 82 via the first and second changeover switches 811, 812.

In this context, the second input of the first input switch 8111 of the first changeover switch 811 is connected to the output of the first input switch 811 of the first changeover switch 811 to connect the second client signal receiving unit 71 to the signal processing input interface 821 of the client signal processing unit 82.

Furthermore, the input of the second output switch 8122 of the second changeover switch 812 is connected to the second output of the second output switch 8122 of the second changeover switch 812 to apply the signal processing output interface 822 of the client signal processing unit 82 to the first client signal transmitting unit 62.

Furthermore, in the second input switch 8121 of the second changeover switch 812, the second input is connected to the output for switching the first client signal receiving unit 61 through to the signal amplification input interface 823 of the client signal processing unit 82.

The input of the first output switch 8112 is coupled to the second output of the first output switch 8112 to pass through the signal amplification output interface 824 of the client signal processing unit 82 to the second client signal transmitting unit 72.

To pass the telegram through the modular robot, the operating mode in the individual active arm modules 5 is then set so that the telegram passes through the client signal processing units 82 in the client bus switch-on unit of the active arm module on the first outgoing channel of the two-channel transmission path in the modular robot.

On the second return path channel, the processed telegram is then looped through the client signal processing unit 82 of the active arm modules 5 for a signal refresh. However, no data is exchanged with the telegram in the client signal processing units 82.

The client signal coupling unit 81 in the first active arm module 5.1 and in the second active arm module 5.2 is thus in the first operating mode, in which the telegram pass-through takes place on the first outgoing channel from the first client module connection face 51 to the second client module connection face 52. In the case of the third active arm module 5.3, the fourth active arm module 5.4, the fifth active arm module 5.5 and the sixth active arm module 5.6, the client signal coupling unit 81 of the corresponding active arm module is in the second operating mode, so that the first outgoing channel runs from the second client module connection face 52 to the first client module connection face 51 during the telegram pass-through.

Data is transmitted in the modular robot in such a way that the server signal processing unit 30 of the robot base 1 outputs a telegram via the server signal transmitting unit 21. The telegram then passes successively through the first active arm module 5.1, the second active arm module 5.2, the first passive arm module 6.1, the third active arm module 5.3, the fourth active arm module 5.4, the second passive arm module 6.2, the fifth active arm module 5.5 and the sixth active arm module 5.6.

The telegram is processed by the client signal processing units 82 of the active arm modules 5 on the fly, whereas the telegram is only looped through the passive arm modules 6. As described, however, it is also possible to provide the passive arm modules 6 with bus switch-on units in order to be able to carry out telegram processing on the fly if necessary.

After the telegram has been processed by the sixth active arm module 5.6, the telegram is then fed back to the server signal receiving unit 22 of the robot base 1. As shown in FIG. 3, the telegram may pass through the client signal processing units 82 of the active arm modules 5 for a signal refresh. However, no data is exchanged with the telegram in the client signal processing units 82. In terms of data technology, the telegram therefore passes through all the arm modules located between the sixth active arm module 5.6 and the arm modules on the robot base 1 without being processed.

In order to allow for the client signal coupling unit 81 in the client modules to determine which client module connection face is connected to the server module connection face directly or via one or a plurality of further client modules, the additional initialization mode is provided, in which the client signal coupling unit 81 of the respective client module determines whether the client signal coupling unit 81 is to be switched to the first or second operating mode in order to enable telegram processing on the first outgoing channel when the telegram passes through on the two-channel ring-shaped transmission path.

In order to allow for the client signal coupling unit 81 in the client module to determine which client module connection face is connected to the server module connection face via one or a plurality of intermediate client modules, a control signal is output to the connected client modules in initialization mode by the server signal processing unit 30 via the server control signal transfer unit 23. The control signal is then received in the first client module connected to the server module by the client control signal transfer unit coupled to the server control signal transfer unit 23 and forwarded to the client signal coupling unit 81 in the client module.

The client signal coupling unit 81 is then embodied to determine whether the client control signal transfer unit on which the control signal was received is on the first client module connection face 51 or the second client module connection face 52. The client module coupling unit 81 then sets the operation mode for message passing so that the client module connection face on which the control signal was received is the client module connection face whose client signal receiving unit is connected to the signal processing input interface 821 of the client signal processing unit 82.

After the client signal coupling unit 82 has evaluated the control signal, the control signal is then forwarded via the client control signal transfer unit on the client connection face on which the control signal was not received to the next client module, which then performs a corresponding evaluation in order to determine the client module connection face for telegram reception on the first outgoing channel.

In the modular robot embodiment shown in FIG. 3, the control signal transmission and evaluation takes place on a separate control line arrangement. The control signal is applied from the server signal processing unit 30 of the robot base 1 to the server control signal transfer unit 23 via the control signal interface 33.

The first active arm module 5.1 then receives the control signal with the first client control signal transfer unit 63 and forwards it to the control signal evaluation unit 813 of the client signal coupling unit 81 for control signal evaluation. The control signal evaluation unit 813 determines that the first client signal transfer unit 62 has received the control signal and then sets the first and second changeover switches 811, 812 of the client signal coupling unit 81 to the first operating mode in which the first client signal receiving unit 61 is connected to the signal processing input interface 821 of the client signal processing unit 82 and the second client signal transmitting unit 72 is connected to the signal processing output interface 822 of the client signal processing unit 82.

The client control signal evaluation unit 813 of the first active arm module 5.1 then applies the control signal to the second client control signal transfer unit 73, whereupon the second active arm module 5.2 then in turn receives the control signal with the first client control signal transfer unit 63. The second active arm module 5.2 then carries out a corresponding evaluation of the control signal and then sets the operating mode, here again the first operating mode, and then forwards the control signal. All downstream active arm modules proceed accordingly and thus set the operating mode of the client-signal coupling unit 81.

The control signal may be a simple high-low level signal. As an alternative to a separate control signal transmission arrangement, the control signal may also be applied directly to the ring-shaped telegram transmission path, so that the additional control signal transmission arrangement is not required. The control signal evaluation unit 813 of the client module is then connected on the receiving side to the first client signal receiving unit 61 and the second client signal receiving unit 71, and on the output side to the first client signal transmitting unit 61 and the second client signal transmitting unit 71.

In the above description, it has been assumed that only the active arm modules 5 comprise a bus interface. If the passive arm modules 6 also comprise a bus interface, the passive arm modules are operated in the same way as the active arm modules.

As an alternative to the embodiment of the client signal coupling unit 81 with 2-1 multiplexers as switches shown in FIG. 3, other embodiments of the operating mode setting may also be provided. It is also possible for the operating mode setting of the client signal coupling unit 81 to additionally indicate on the client module on which client module connection face telegrams are received on the first outgoing channel of the two-channel ring-shaped transmission path.

Furthermore, the client module may also comprise more than two client module connection faces, in which case the number of operating modes of the client signal coupling unit corresponds to the number of connection faces. The client signal coupling unit is then embodied in such a way that, regardless of which of the client module connection faces is connected to the server module connection face directly or via one or a plurality of further client modules, the client signal receiving unit of this server module connection face is always coupled to the signal processing input interface of the client signal processing unit.

This invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

wherein each client module comprises a client module housing having a first client module connection face comprising a first client signal transfer unit having a first client signal transmitting unit and a first client signal receiving unit, a second client module connection face comprising a second client signal transfer unit having a second client signal transmitting unit and a second client signal receiving unit, and a client bus switch-on unit having a client signal coupling unit and a client signal processing unit;

wherein a signal processing input interface and a signal processing output interface of the client signal processing unit are connected to the client signal coupling unit, the client signal coupling unit being connected to the first client signal transmitting unit, the first client signal receiving unit, the second client signal transmitting unit and the second client signal receiving unit;

wherein, in a first mode of operation, the client signal coupling unit connects the first client signal receiving unit to a signal processing input interface of the client signal processing unit and the second client signal transmitting unit to a signal processing output interface of the client signal processing unit, and, in a second mode of operation, couples the second client signal receiving unit to the signal processing input interface of the client signal processing unit and the first client

TABLE 1

| List of reference symbols | |
|---|---|
| 1 robot base | 50 client module housing |
| 2 robot arm | 51 first client module connection face |
| 5 active arm module | 52 second client module connection face |
| 5.1 first active arm module | 60 first client signal transfer unit |
| 5.2 second active arm module | 61 first client signal receiving unit |
| 5.3 third active arm module | 62 first client signal transmitting unit |
| 5.4 fourth active arm module | 63 first client control signal transfer unit |
| 5.5 fifth active arm module | 70 second client signal transfer unit |
| 5.6 sixth active arm module | 71 second client signal receiving unit |
| 6 passive arm module | 72 second client signal transmitting unit |
| 6.1 first passive arm module | 73 second client control signal transfer unit |
| 6.2 second passive arm module | 80 client bus switch-on unit |
| 7 distal end | 81 client signal coupling unit |
| 10 server module housing | 811 first changeover switch |
| 11 server module connection face | 8111 first input switch |
| 13 drive unit | 8112 first output switch |
| 20 server signal transfer unit | 812 second changeover switch |
| 21 server signal transmitting unit | 8121 second input switch |
| 22 server signal receiving unit | 8122 second output switch |
| 23 server control signal transfer unit | 813 control signal evaluation unit |
| 30 server signal processing unit | 82 client signal processing unit |
| 31 signal output interface | 821 signal processing input interface |
| 32 signal input interface | 822 signal processing output interface |
| 33 control signal interface | 823 signal amplification input interface |
| | 824 signal amplification output interface |

What is claimed is:

1. A modular machine-automation system comprising:
a server module, and a plurality of client modules,
wherein the server module comprises a server module housing having a server module connection face comprising a server signal transfer unit having a server signal transmitting unit and a server signal receiving unit, and a server signal processing unit,
wherein a signal output interface of the server signal processing unit is connected to the server signal transmitting unit and a signal input interface of the server signal processing unit is connected to the server signal receiving unit in order to transmit signals, and signal transmitting unit to the signal processing output interface of the client signal processing unit in order to transmit signals, wherein the first and second client module connection faces of each client module being respectively connectable to the server module connection face or the first and second client module connection faces of a further client module, in order to couple the client signal transfer unit of the client module connection face of the client module to the server signal transfer unit of the server module connection face or to the client signal transfer unit of the connected client module connection face of the further client module in order to transmit signals; and wherein, in an initialization mode, the client signal coupling unit in the client bus switch-on unit of the client module is configured to determine which client module connection face is connected to the server module connection face directly or via one or a plurality of such further client modules, in order to switch to the first operating mode when the first client module connection face is coupled directly or via the one or plurality of further client modules to the server module connection face, and to switch to the second operating mode when the second client module connection face is coupled directly or via the one or plurality of further client modules to the server module connection face so that a ring-shaped transmission path having two channels is configured in which telegrams are processed on one channel with the aid of the client signal processing unit in the client module.

2. The modular machine-automation system according to claim 1, wherein:

the server signal transfer unit comprises a server control signal transfer unit, the first client signal transfer unit comprises a first client control signal transfer unit, and the second client signal transfer unit comprises a second client control signal transfer unit;

wherein the server control signal transfer unit is connected to the server signal processing unit and the first and second client control signal transfer units are connected to the client signal coupling unit, wherein in the initialization mode, the server signal processing unit is configured to output a control signal and the client signal coupling unit is configured to receive and forward the control signal, wherein the client signal coupling unit is further configured to determine from which of the client signal transfer units the control signal has been received, in order to determine the client module connection face which is connected to the server module connection face directly or via the one or plurality of further client modules as the client module connection face comprising the client signal transfer unit with the client signal transfer unit on which the control signal was received.

3. The modular machine-automation system according to claim 2, wherein the control signal is a high-low level signal.

4. The modular machine-automation system according to claim 1, wherein the client-signal coupling device comprises a first changeover switch and a second changeover switch, each comprising at least one 2-1 multiplexer.

5. The modular machine-automation system according to claim 4, wherein:

the client signal processing unit comprises a signal amplification path having a signal amplification output interface and a signal amplification input interface, the first changeover switch comprises a first input switch and a first output switch, and the second changeover switch comprises a second input switch and a second output switch;

wherein a first input of the first input switch is connected to the first client signal receiving unit, a second input of the first input switch is connected to the second client signal receiving unit, and an output of the first input switch is connected to the signal processing input interface of the client signal processing unit, wherein a first input of the second input switch is connected to the second client signal receiving unit, a second input of the second input switch is connected to the first client signal receiving unit, and an output of the second input switch is connected to a signal amplification input interface of the client signal processing unit, wherein an input of the first output switch is connected to a signal amplification output interface of the client signal processing unit, a first output of the first output switch is connected to the first client signal transmitting unit and a second output of the first output switch is connected to the second client signal transmitting unit, and wherein an input of the second output switch is connected to the signal processing output interface of the client signal processing unit, a first output of the second output switch is connected to the second client signal transmitting unit, and a second output of the second output switch is connected to the first client signal transmitting unit.

6. A modular robot having a robot arm comprises:

a server module, and a plurality of arm modules, each arm module including an arm module housing having a first arm module connection face comprising a first arm module signal transfer unit having a first arm module signal transmitting unit and a first arm module signal receiving unit, a second arm module connection face comprising a second arm module signal transfer unit having a second arm module signal transmitting unit and a second arm module signal receiving unit, an arm module bus switch-on unit and an arm module signal processing unit;

wherein, in an initialization mode, an arm module signal coupling unit in the arm module bus switch-on unit of the arm module is configured to determine which arm module connection face is connected to a server module connection face, directly or via one or a plurality of further arm modules, in order to switch to a first operating mode when the first arm module connection face is coupled directly or via the one or plurality of further arm modules to the server module connection face, and in order to switch to a second operating mode when the second arm module connection face is coupled directly or via the one or plurality of further arm modules to the server module connection face, such that a ring-shaped transmission path having two channels is configured in which telegrams are processed on one channel with the aid of the arm module signal processing unit in the arm module.

7. The modular robot according to claim 6, wherein the plurality of arm modules are active arm modules and passive arm modules, wherein the active arm modules each comprise a drive device with the aid of which a further arm module connectable thereto may be pivoted, turned and/or rotated.

8. The modular machine-automation system according to claim 7, configured as a modular robot, wherein in the active arm module, the first connection face is configured to be controllably rotatable relative to the second connection face about an axis of rotation, and wherein the first connection face is arranged on the arm module so as to be rotatable about the axis of rotation and the second connection face is arranged on the arm module so as to be non-rotatable.

9. The modular machine-automation system according to claim 8, wherein the active arm module comprises a rotation transmitting device for signals, energy and/or fluid in order to connect the first connection face optically, electrically and/or fluidically to the second connection face.

10. A modular machine-automation system comprising:

a server module, and a plurality of client modules, each client module including a client module housing having a first client module connection face comprising a first client signal transfer unit having a first client signal transmitting unit and a first client signal receiving unit, a second client module connection face comprising a second client signal transfer unit having a second client signal transmitting unit and a second client signal receiving unit, and a client bus switch-on unit and a client signal processing unit;

wherein, in an initialization mode, a client signal coupling unit in the client bus switch-on unit of the client module is configured to determine which client module connection face is connected to a server module connection face directly or via one or a plurality of further client modules in order to switch to a first operating mode when the first client module connection face is coupled directly or via the one or plurality of further client modules to the server module connection face, and in order to switch to a second operating mode when the second client module connection face is coupled directly or via the one or plurality of further client modules to the server module connection face, so that a ring-shaped transmission path having two channels is configured in which telegrams are processed on one channel with the aid of the client signal processing unit in the client module.

11. The modular machine-automation system according to claim 10, wherein:

the server signal transfer unit comprises a server control signal transfer unit, the first client signal transfer unit comprises a first client control signal transfer unit, and the second client signal transfer unit comprises a second client control signal transfer unit;

wherein the server control signal transfer unit is connected to the server signal processing unit and the first and second client control signal transfer units are connected to the client signal coupling unit; and wherein in the initialization mode, the server signal processing unit is configured to output a control signal and the client signal coupling unit is configured to receive and forward the control signal, wherein the client signal coupling unit is further configured to determine from which of the client signal transfer units the control signal has been received, in order to determine the client module connection face which is connected to the server module connection face directly or via the one or plurality of further client modules as the client module connection face comprising the client signal transfer unit with the client signal transfer unit on which the control signal was received.

12. The modular machine-automation system according to claim 11, wherein the control signal is a high-low level signal.

13. The modular machine-automation system according to claim 10, wherein the client-signal coupling device comprises a first changeover switch and a second changeover switch, each comprising at least one 2-1 multiplexer.

14. The modular machine-automation system according to claim 13, wherein:

the client signal processing unit comprises a signal amplification path having a signal amplification output interface and a signal amplification input interface, wherein the first changeover switch comprises a first input switch and a first output switch and the second changeover switch comprises a second input switch and a second output switch, wherein a first input of the first input switch is connected to the first client signal receiving unit, a second input of the first input switch is connected to the second client signal receiving unit, and an output of the first input switch is connected to the signal processing input interface of the client signal processing unit, wherein a first input of the second input switch is connected to the second client signal receiving unit, a second input of the second input switch is connected to the first client signal receiving unit, and an output of the second input switch is connected to a signal amplification input interface of the client signal processing unit, wherein an input of the first output switch is connected to a signal amplification output interface of the client signal processing unit, a first output of the first output switch is connected to the first client signal transmitting unit and a second output of the first output switch is connected to the second client signal transmitting unit, and wherein an input of the second output switch is connected to the signal processing output interface of the client signal processing unit, a first output of the second output switch is connected to the second client signal transmitting unit, and a second output of the second output switch is connected to the first client signal transmitting unit.

15. A client module for a modular machine-automation system configured according to claim 10.

* * * * *